Aug. 28, 1928.

T. E. MURRAY 1,682,403

BARREL

Filed Nov. 22, 1920

INVENTOR
Thomas E. Murray
BY
Anthony Usina
ATTORNEY

Patented Aug. 28, 1928.

1,682,403

UNITED STATES PATENT OFFICE.

THOMAS E. MURRAY, OF BROOKLYN, NEW YORK.

BARREL.

Application filed November 22, 1920. Serial No. 425,605.

My invention aims to provide an improved steel barrel or other hollow sheet metal article, which can be cheaply made and has peculiar features of advantage as hereinafter described.

The accompanying drawings illustrate embodiments of the invention.

The barrel is made of two halves 1 and 2 of sheet metal divided along a horizontal plane. Such shapes can be readily and cheaply stamped or drawn from sheet metal. The abutting edges of these two halves are then united. For example, they may be welded together by the method described in the reissue patent of Thomas E. Murray, Jr. No. 15,466 of October 10, 1922.

Figure 1:
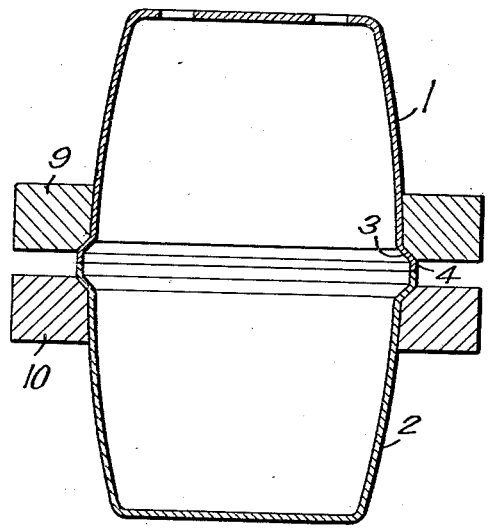
Figs. 1, 2 and 3 are longitudinal sections illustrating in alternative forms the shapes of the parts which are united to form the barrel.

The segments 1 and 2 are formed at their open edges with flanges which strengthen the barrel along this plane where it is subjected to the chief strain in handling. In Fig. 1 the parts are formed with an outward oblique flange 3 at the outer edge of which is a short vertical flange 4, the edges of these flanges being butted directly against each other. According to Fig. 2, the parts are formed with horizontal flanges 5 and vertical flanges 6 which are similarly butted against each other. According to Fig. 3 the parts are formed with oblique outward flanges 7 bent inward at their edges to form oblique inward flanges 8, the parts being butted together along the folds between the flanges 7 and 8. These flanges serve not only to stiffen the barrel but also to assist in uniting the parts. The parts are pressed together by means of heavy rings 9 and 10 which bear against the outward flanges and which, in weldig them by the process above described, serve also as the electrodes through which the welding current passes to the parts of the barrel.

Figure 5:
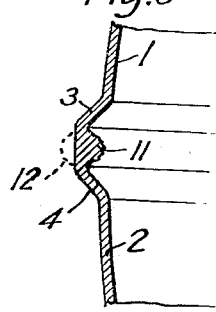

In the case shown in Fig. 1, the softening of the metal and the pressing of it together will produce a joint somewhat on an enlarged scale as shown in Fig. 5 with an irregular rib 11 extruded along the inside and a similar rib 12 on the outside of the joint. Preferably the outside rib 12 will be afterwards cut or ground off to leave a smooth finish.

Figure 2:
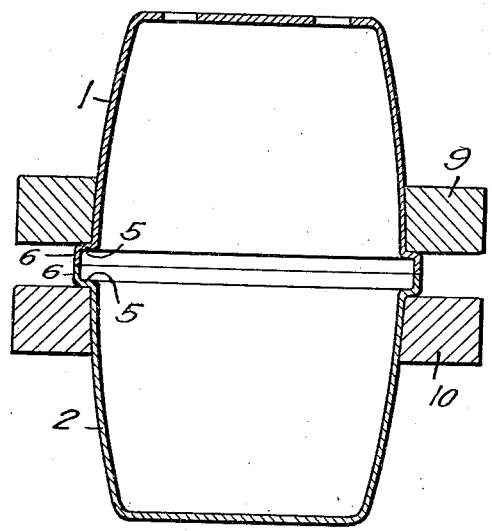
Figure 6:
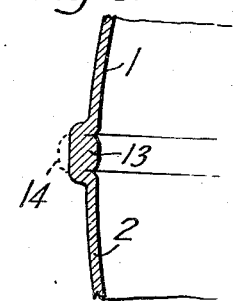

With the shape of parts shown in Fig. 2 the joint of the completed barrel will be somewhat as shown in Fig. 6 with a rib 13 on the inside approximately flush with the face of the parts 1 and 2 and with a rib 14 on the outside which should also preferably be removed.

Figure 3:
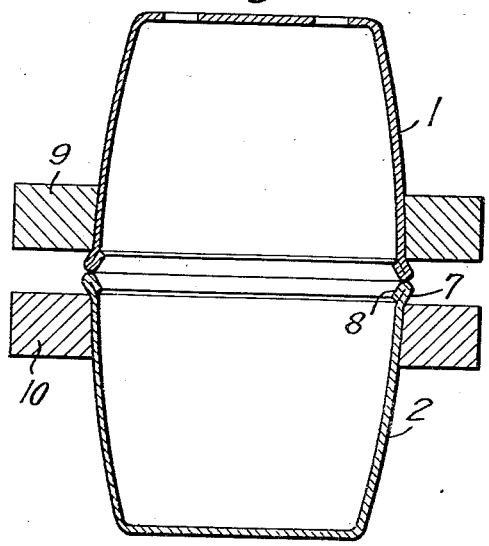
Figure 4:
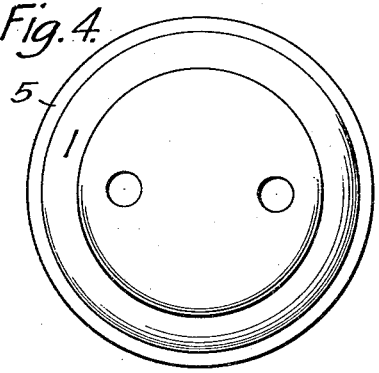
Fig. 4 is a plan of the barrel and Figs. 5, 6 and 7 are sections of the finished joint.
Figure 7:
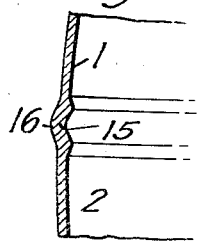

Fig. 3 is designed to produce a joint somewhat as shown in Fig. 7 with a thickened portion of metal 15 approximately flush on the inside with the inner faces of the parts 1 and 2 and forming a rounded rib 16 on the outside.

The segments 1 and 2 are formed each with one of the ends of the barrel. Instead of making the barrel of two segments as illustrated it may be made of three or more segments similarly united along their transverse edges.

Although I have illustrated the invention as applied to a common form of barrel, it will be understood that cylindrical casks and various similar holow sheet metal articles may be made in accordance with the invention. To butt weld electrically the edges of two segments of the comparatively thin sheet metal required for economy is a difficult matter; especially so for a barrel or a large tube where the edges are correspondingly long. It is difficult to hold the parts to be welded in accurate registry in the welding machine, that is, with their butt edges bearing centrally on each other. The passage of the alternating welding current causes lateral vibrations of the edges which throw them out of registry so that the resulting joint may be thinner than the width of the butt edges themselves and, therefore, weaker as well as unsightly. By offsetting the edge portions of the metal, a cheap and simple way of stiffening them is attained. And the outward direction of the offset provides convenient bearing shoulders for the electrodes or other means used to press the segments together.

According to the Murray method of welding described in the reissue patent above referred to, a current of extremely high amperage is applied for a very brief interval of time. It is particularly important in this process that the electrodes make a good contact with the work and that the pressure be strongly applied so as to take up the metal quickly when it is softened by the current and also that the edges be held against vibration. The offsetting of the edge portions of the segments as described is a feature of major importance in this method of producing the article.

In the first place, such offsetting provides a transverse bearing for the electrodes by which they are pressed into intimate contact with the work during the welding operation. The offset face may be squarely transverse as in Fig. 2 or obliquely transverse as in Figs. 1 and 3. In any of these cases, it is transverse as distinguished from the ordinary case of electrodes which are clamped around the substantially cylindrical surface of tubular work so as to have only a radial bearing thereon. In the second place, by bringing the electrodes to bear not only on the cylindrical surface but also on the offset surface as in Figs. 1 and 2, for a given height of the electrode, this provides an increased contact area, which again facilitates the passing of the current from the electrodes to the work.

Though I have described with great particularity of detail certain specific embodiments of the invention yet it will be understood that the invention is not restricted to the particular embodiments disclosed. Various modifications thereof in detail and in the arrangement of the parts may be made by those skilled in the art without departure from the invention as defined in the following claims.

What I claim is—

1. A barrel formed of segments each including a head and a tubular portion of sheet metal of comparatively large diameter and slight thickness, which segments are butt-welded along transverse edges, said segments near their meeting edges being bent outward and forward so as to form bearing shoulders of extended area and transverse direction for the pressing of the edges together by means of electrodes and for stiffening such edges to maintain them in register during the welding operation.

2. In the making of a barrel, the method which consists in forming segments each including a head and a tubular portion of sheet metal of comparatively large diameter and slight thickness, said segments near their meeting edges being bent outward and forward so as to form bearing shoulders of extended area and transverse direction, which stiffen the edges and hold them in register during the welding operation, and butt-welding said edges together by pressing them between electrodes bearing against said shoulders while passing an electric current between the electrodes and across the joint.

In witness whereof, I have hereunto signed my name.

THOMAS E. MURRAY.